(12) United States Patent
Vogt et al.

(10) Patent No.: US 11,149,419 B2
(45) Date of Patent: Oct. 19, 2021

(54) DRINKING WATER CIRCULATION DEVICE

(71) Applicant: Gebr. Kemper GmbH + Co. KG Metallwerke, Olpe (DE)

(72) Inventors: Alexander Vogt, Attendorn (DE); Tim Schleime, Attendorn (DE); Hendrik Hössel, Drolshagen (DE); Tobias Theile, Drolshagen (DE)

(73) Assignee: GEBR. KEMPER GMBH + CO., KG METALLWERKE, Olpe (DE)

( * ) Notice: Subject to any disclaimer, the term of this patent is extended or adjusted under 35 U.S.C. 154(b) by 0 days.

(21) Appl. No.: 16/798,968

(22) Filed: Feb. 24, 2020

(65) Prior Publication Data

US 2020/0284001 A1    Sep. 10, 2020

(30) Foreign Application Priority Data

Mar. 8, 2019    (DE) .................... 20 2019 001 121.8

(51) Int. Cl.
*E03B 7/07*    (2006.01)
*E03C 1/044*    (2006.01)
(Continued)

(52) U.S. Cl.
CPC .............. *E03C 1/044* (2013.01); *E03B 7/04* (2013.01); *E03B 7/07* (2013.01); *C02F 2307/10* (2013.01);
(Continued)

(58) Field of Classification Search
CPC .......... E03C 1/044; E03B 7/045; E03B 7/074; C02F 2307/12; F24D 17/0078; F24D 17/0089; F24D 17/0026
See application file for complete search history.

(56) References Cited

U.S. PATENT DOCUMENTS

2009/0308577 A1    12/2009    Witschke et al.
2012/0078424 A1    3/2012    Raghavachari
(Continued)

FOREIGN PATENT DOCUMENTS

CN    1216100 A    11/1997
CN    101133373 A    2/2008
(Continued)

OTHER PUBLICATIONS

Chinese Office Action in 202010150884.4 dated Dec. 25, 2020.
(Continued)

*Primary Examiner* — Reinaldo Sanchez-Medina
(74) *Attorney, Agent, or Firm* — Fay Sharpe LLP

(57) ABSTRACT

The present invention intends to provide a drinking water circulation device (2) for cold water consumption, which is compactly accommodable in a building, universally and easily connectable to different cooling devices, easy to operate and, in addition, little failure-prone and easy to install. This drinking water circulation device (2) comprises a heat exchanger for cooling the drinking water, a return connection (24) for feeding drinking water returned from a circulation pipe into the drinking water circulation device (2), a supply connection (26) for discharging the cooled drinking water from the drinking water circulation device (2), a drinking water circulation pump (10) provided between the return connection (24) and the supply connection (26), a buffer tank (4) for a cooling medium (22), a cooling medium pump (22) provided in a cooling medium flow path between the buffer tank (4) and the heat exchanger (6), a control device (12) for controlling the cooling medium pump (8) and a supply temperature sensor (56), which is associated with the supply and is data-connected to the control device (12).

12 Claims, 3 Drawing Sheets

(51) Int. Cl.
*E03B 7/04* (2006.01)
*F25B 29/00* (2006.01)

(52) U.S. Cl.
CPC ......... *C02F 2307/14* (2013.01); *F25B 29/006* (2013.01)

(56) References Cited

U.S. PATENT DOCUMENTS

| | | | |
|---|---|---|---|
| 2012/0204981 A1 | 8/2012 | Coerdt et al. | |
| 2014/0261763 A1* | 9/2014 | Beckman | F24D 17/0005 137/337 |
| 2015/0377497 A1* | 12/2015 | Haws | F24D 17/0089 137/337 |
| 2018/0119990 A1 | 5/2018 | Alsadah | |
| 2018/0347830 A1* | 12/2018 | Callahan | F24H 1/122 |
| 2019/0331348 A1* | 10/2019 | Lesage | F24D 19/1051 |

FOREIGN PATENT DOCUMENTS

| | | |
|---|---|---|
| CN | 102419131 A | 4/2012 |
| DE | 10 2005 036 861 | 2/2007 |
| DE | 20 2014 001131 U1 | 5/2014 |
| DE | 202014001131 U1 | 5/2014 |
| DE | 202014001131 U1 | 6/2014 |
| DE | 20 2014 103 193 | 8/2015 |
| EP | 3 037 591 | 9/2011 |
| EP | 2966384 A1 | 1/2016 |

OTHER PUBLICATIONS

Search Report from Singapore Application No. 10202001785R dated Jan. 29, 2021.
European Search Report for European Patent Application No. EP 20161713 dated Aug. 4, 2020.
German Search Report for corresponding German Publication No. 20 2019 001 121.8 dated Jan. 31, 2020.

* cited by examiner

DRINKING WATER CIRCULATION DEVICE

This application claims priority to German Patent Application Serial No. 202019001121 filed Mar. 8, 2019, the entirety of which is fully incorporated by reference herein.

The present invention relates to a drinking water circulation device.

EP 3 037 591 B1 discloses a drinking water system for cold drinking water (PWC), provided with a heat exchanger and a circulation pump, so as to feed cold drinking water to various consumers in a building. Downstream of the consumers, at least one thermal regulating valve is provided, which controls the volume flow depending on the temperature of the cold water at the consumer, so that a sufficient amount of cold water will always be present at the consumers. Downstream of the last consumer, seen in the direction of flow, a circulation pipe follows, which has the thermal regulating valve provided therein, the circulation pipe being provided with a pump that supplies the water having, relatively, an excessively high temperature to a heat exchanger. In this way, cold water circulates regularly within the drinking water system. Stagnation and thus heating to inadmissibly high temperatures of the cold drinking water is avoided.

The present invention intends to provide for such a drinking water circulation device for cold water consumption, which is compactly accommodable in a building, universally and easily connectable to different cooling devices, easy to operate and, in addition, little failure-prone and easy to install.

In order to achieve this object, the present invention discloses a drinking water circulation device having the features of claim 1. This drinking water circulation device combines a plurality of elements of a drinking water circulation system for cold water, which are known per se, e.g. a heat exchanger and a drinking water circulation pump. The heat exchanger is provided for cooling the drinking water. It is provided with a return connection for feeding drinking water returned from a circulation pipe and a supply connection for discharging the cooled drinking water from the circulation device. The drinking water circulation pump is provided between these two connections. The two connections form interfaces of the drinking water circulation system according to the present invention for feeding the drinking water to be cooled into the drinking water circulation device and for discharging the same.

In addition, the drinking water circulation device according to the present invention comprises a buffer tank for a cooling medium. The cooling of the cooling medium normally takes place separately from the drinking water circulation device. Usually, cooling medium supply and return lines leading to the buffer tank are provided, which have suitable cooling medium connections that are normally exposed on the outer side of the drinking water circulation device. In addition, the drinking water circulation device has a cooling medium pump provided in a flow path between the buffer tank and the heat exchanger, so as to circulate the cooling medium within the drinking water circulation device.

Finally, the drinking water circulation device according to the present invention comprises at least one temperature sensor, which is associated with the supply of the cooled drinking water. Optionally, the drinking water circulation device according to the present invention comprises a return temperature sensor associated with the still warm drinking water returned from the circulation. Further optionally, the drinking water circulation device according to the present invention comprises a cooling medium temperature sensor, which measures the temperature of the cooling medium and, preferably as an insertion sensor with a thermowell, determines the temperature of the cooling medium in the buffer tank in order to formulate a cooling demand therefrom, on the basis of which the external cooling medium feed unit is caused to feed treated cooled cooling medium.

The above-mentioned temperature sensors are data-connected to a control device which, together with the temperature sensors, is provided as part of the circulation device according to the present invention that forms a structural unit. Depending on the number of temperature sensors used, different control concepts may be pursued. For example, the at least one temperature sensor is evaluated by the control device for detecting the drinking water supply temperature and used to control the cooling medium pump. In this variant, the drinking water circulation pump is adapted to the drinking water system but is operated at constant capacity. In the optional first variant, a second temperature sensor is evaluated by the control device for measuring the drinking water return temperature and used to control the drinking water circulation pump. The optional third temperature sensor is used for recharging the buffer tank.

On the basis of this structural design, the drinking water circulation device according to the present invention can be prefabricated as a uniform component, whereby the possibility of mounting errors will be reduced. The drinking water circulation device according to the present invention has a compact structural design. Usually, the buffer tank forms a support area, which supports the other technical components of the drinking water circulation device according to the present invention. The technical components of the drinking water circulation device according to the present invention, viz. at least the heat exchanger, pipes of the drinking water path within the drinking water circulation device, the circulation pump, the cooling medium pump and the control device, are thus arranged above the buffer tank. This has the advantage that all the technical components are easily accessible from above. In addition, the control device and an associated operating unit, respectively, can be operated from above and thus in an ergonomically advantageous manner. The structural design in question offers the further advantage of a compact structural design and an optimum center of gravity of the drinking water circulation device according to the present invention. The latter can thus easily be installed and handled. Furthermore, at least in cases where the buffer tank has a relatively small storage capacity, a superstructure of comparatively limited height can be accomplished. To this end, the buffer tank has a storage capacity (nominal capacity) of 100 l+/−30 l. Even if all the technical components are arranged above the buffer tank, it will be possible to limit the height of the drinking water circulation device to approx. 80 cm+/−10 cm. Since the control device is located on this level, it can be operated easily and ergonomically.

The control device preferably has an operating unit that is oriented perpendicularly upwards, so that the user interface will be oriented horizontally and can be accessed from above, whereby the ergonomics will be improved still further.

The drinking water circulation device according to the present invention preferably uses a water/glycol mixture as a cooling medium. This means that a plumber who puts the circulation device into operation need not be specially qualified to handle cooling media that are hazardous to health or impair the environment ("Kältemittelschein" (proof of competence for refrigerants)). In addition, glycol is listed in liquid class 3, so that it will suffice when the heat exchanger separates the drinking water to be cooled from the cooling medium by a single wall. This will reduce the overall size and the manufacturing costs of the heat exchanger. In addition, the heat transfer between the two media within the heat exchanger will be improved in this way.

The suggested buffer tank offers the further advantage that permanent circulation and treatment of the cooling medium is not necessary. Rather, cooling medium will be supplied by an external cooling medium treatment unit only in response to a signal of the control device and on demand. It follows that the drinking water circulation device according to the present invention can be operated autonomously and without any supply of a treated cooling medium for a certain period of time. This allows the energy costs for the operation of the drinking water circulation device to be reduced. Nor is it necessary that the cooling medium treatment unit runs in continuous operation, so that the maintenance costs for the cooling medium treatment unit can be reduced. Furthermore, the buffer tank volume according to the present invention ensures that a cooling medium treatment unit, which may possibly be provided only for the drinking water circulation device, has to be switched on and off less frequently, whereby the efficiency and the service life will be improved still further. The use of a buffer tank also allows a free selection of the type of cooling medium treatment, since precise matching of the thermal outputs between the cooling medium treatment unit and the drinking water circulation device will not be necessary.

According to a preferred further development of the present invention, the drawback of a comparatively small buffer tank volume is compensated by at least one horizontally extending perforated plate installed in the buffer tank in the area of a cooling medium inlet. The cooling medium inlet is here the flow path within the buffer tank through which the cooling medium is conducted back into the buffer tank after having passed the heat exchanger. Due to this perforated plate, the medium cannot pass unhindered from above into a lower area of the buffer tank. Rather, this comparatively warm cooling medium will mix and distribute itself in the upper area of the buffer tank and eventually sinks down when cooling leading to a higher density. It follows that, in spite of a small storage capacity and comparatively high volume flows, a good temperature stratification will be maintained within the buffer tank, with the comparatively cold cooling medium being located at the bottom of the buffer tank, whereas the comparatively warm cooling medium is located in the upper area of the buffer tank. This effect can be improved still further by a plurality of horizontally installed perforated plates in the area of the cooling medium inlet. The holes of the perforated plates should here be displaced relative to one another.

It goes without saying that, due to the temperature stratification, cooling medium will be sucked in by the cooling medium pump from the bottom of the buffer tank. There, a suction opening of a suction pipe installed in the buffer tank is provided, the suction pipe leading to the cooling medium intake side of the heat exchanger.

With due regard to the desired compact structural design of the drinking water circulation device according to the present invention, a preferred further development of the present invention suggests to provide a plate heat exchanger, which is mounted in oblique orientation relative to the gravitational field of the earth and above the surface of the buffer tank. The oblique orientation reduces the installation height of the device according to the present invention. Since the plate heat exchanger is slightly rotationally displaced relative to the horizontal, i.e. arranged in an angled orientation, it can be vented by flushing. Air is accordingly removed from the heat exchanger through the flowing medium. Nevertheless, due to the oblique orientation in the gravitational field of the earth, the temperature difference of the medium and thus the density difference of the cooling medium is utilized for the stratified flow within the heat exchanger.

On the side of the cooling medium, the heat exchanger may have a vent valve at the uppermost point thereof. The respective side of the heat exchanger has its connections at the top so that venting of the heat exchanger at this point will actually be guaranteed for the cooling medium side. Since air cannot enter the cooling medium circulation during operation, the latter only needs to be vented when the device according to the present invention is put into operation or subsequent to maintenance thereof. Hence, the device can be put into operation without the necessity of removing the diffusion-tight thermal insulation fully or partly.

The technical components of the drinking water circulation device according to the present invention are usually surrounded by a thermal insulation. Only the operating unit may be exposed on the outer side within the thermal insulation and may thus be accessible without having to remove the thermal insulation. The thermal insulation preferably consists of thermal insulation components that are interconnected via plug connections. Gluing the thermal insulation components will thus no longer be necessary, neither during mounting nor during maintenance. The plug connection can easily be established by any third party, so that good insulation and diffusion tightness will permanently be guaranteed.

The insulation usually comprises a foamed component of the buffer tank. This foamed component normally surrounds the whole circumference of the tank. Usually, the foamed component also surrounds the bottom, so that the buffer tank will regularly rest on the foamed component. This foamed component has attached thereto a cover of the thermal insulation, which can preferably accommodate the operating unit of the control device. The control device and the buffer tank have normally provided between them an additional insulation, which fills free spaces between the control device and the buffer tank and thermally insulates the control device. The control device may here comprise a plurality of separately provided components, such as a separate control housing and a data logger in another housing.

It goes without saying that pipelines that extend from the thermal insulation to the outside are sealed against the thermal insulation by means of a swelling tape or some other type of seal.

In order to exclude air to the greatest possible extent within the space enclosed by the thermal insulation, this thermal insulation is configured such that it follows the contours of the media-carrying components of the drinking water circulation device. The thermal insulation thus surrounds these technical components with little play. In this way, moisture, which may be trapped in the foamed space during mounting of the device according to the present invention, is reduced to a considerable extent. The remaining amount of moisture is bound by suitable measures, such as a silicate bag, so that no free amount of moisture remains, which could condense on the colder components of the drinking water circulation device according to the present invention during operation.

According to a preferred further development of the present invention, the operating unit is provided in a cover of the thermal insulation. The cover can be detached from the remaining part of the thermal insulation around the technical components by disconnecting the plug connection. When the cover has been removed, all the interfaces on pipes of the drinking water circulation device according to the present invention to the pumps and the heat exchanger are accessible from above. The cover has ducts formed by recesses in the surface thereof, in which electrical lines leading to the drinking water circulation device are laid, the cover forming preferably a reception means receiving a plug therein by means of which the conduction path of the electrical lines can be separated. This plug is disconnected prior to lifting off the cover. The plug is here accommodated in the cover such that it is inevitably necessary to disconnect the plug connection prior to lifting off the cover, so as to first power-off the circulation device for the purpose of mounting and maintenance. It follows that lifting off the cover necessitates that the drinking water circulation device according to the present invention is disconnected from the mains.

The electrical lines leading away from the device are plug-connectable via a plug element and a mating connector element to the lines leading to the device, so that, when the cover is lifted off, it will first be necessary to disconnect this plug connection, the cabling in the drinking water circulation device remaining then neatly laid. Only the piece of cable connecting the plug connection to the control device remains on the control device.

Further details and advantages of the present invention result from the description of an embodiment following hereinafter in combination with the drawing, in which.

Figure 1:
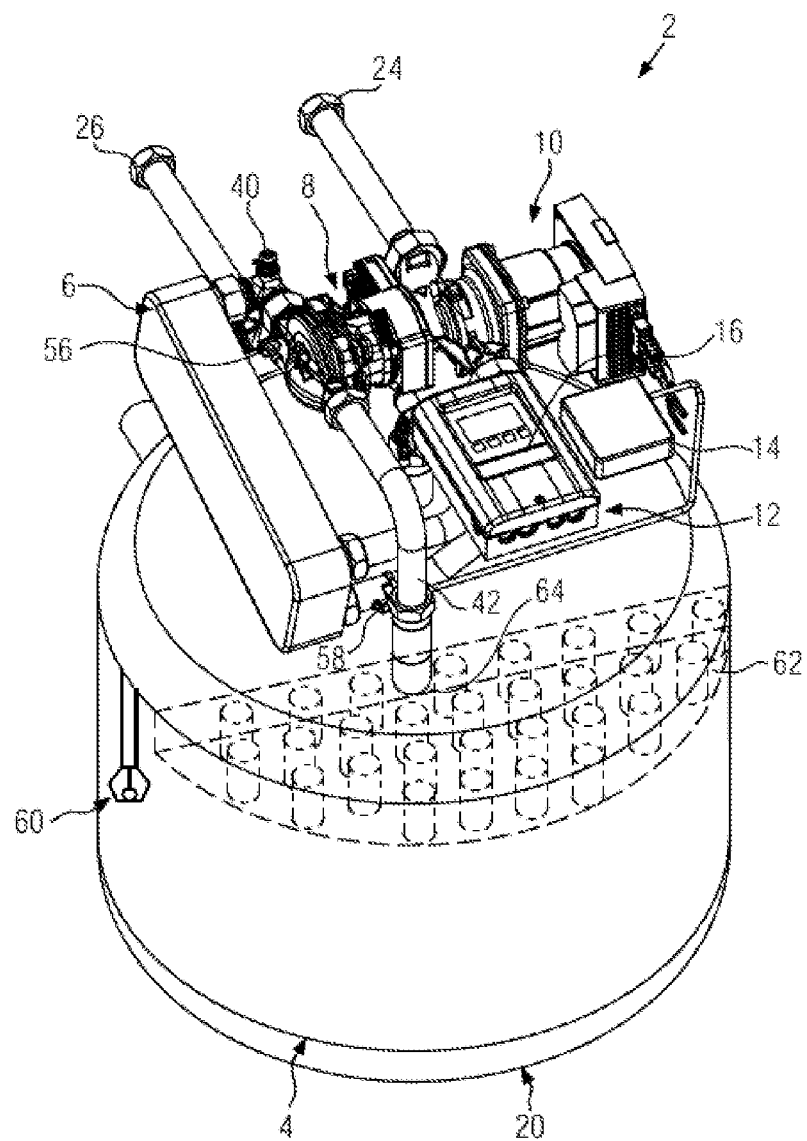
FIG. 1 shows a perspective side view of the technical components of the embodiment.

FIG. 1 shows a drinking water circulation device without thermal insulation and without an external housing, which forms a visual cover. The technical components of the drinking water circulation device 2 are a buffer tank 4, a plate heat exchanger 6 forming the heat exchanger, a cooling medium pump 8, a drinking water circulation pump 10 and a control device 12, which also comprises a data logger 14. The control device 12 comprises an operating unit 16, which is exposed on the outside of the drinking water circulation device.

The buffer tank 4 is cylindrical in shape and is formed with a bottom 20 having the specified support area, which has the technical components placed thereon. The technical components provided above the buffer tank are located within the base area defined by the buffer tank 4. The control device 12 is insulated on the underside thereof against the buffer tank 4 via a thermal insulation component, which is not shown.

On a circumferential section of the buffer tank 4, supply and return connections protrude radially in relation to the buffer tank 4, of which only one cooling medium connection 22 is visible and via which the cooling medium is delivered to the buffer tank 4 and excessively warm cooling medium is discharged from the buffer tank 4. The same circumferential section has provided thereon a supply connection 26 and a return connection 24 for the drinking water to be cooled in the device 2. At these points, the insulation provided around the complete rest of the whole circumference of the buffer tank 4 is cut out so that suitable feed pipes can be passed through the insulation.

Figure 2:
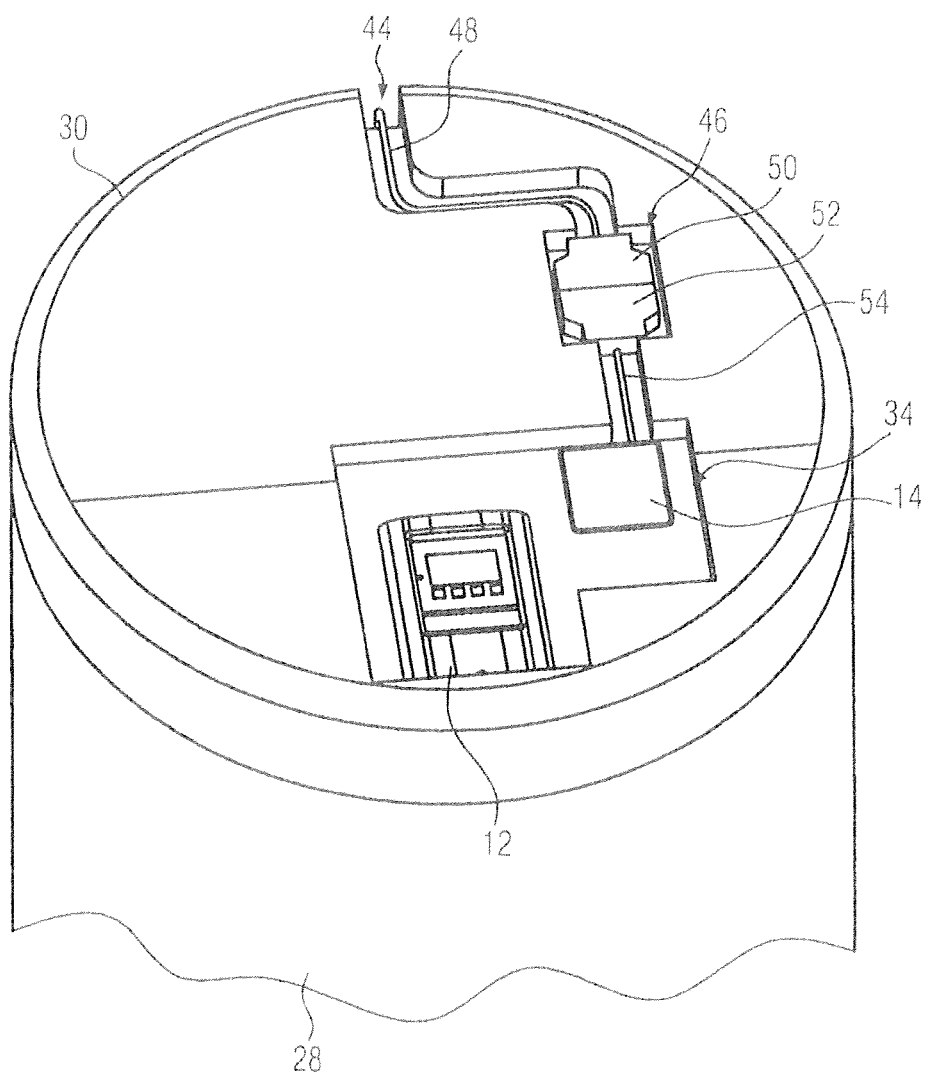
FIG. 2 shows a perspective top view of the embodiment with full thermal insulation and FIG. 3 shows a view similar to FIG. 2 with the cover removed.

FIG. 2 illustrates the thermal insulation comprising three thermal insulation components, viz. a circumferentially extending foamed component of the buffer tank 4 surrounding the latter almost completely and identified by reference numeral 28, a cover 30 and a control element insulation 32. These three thermal insulation components 28 to 32 each consist of a foamed plastic material.

The cover 30 has formed therein a window 34, in which part of the control element insulation 32 as well as the upper side of the control device 12 and the data logger 14 are exposed. These electronic components of the embodiment can thus be accessed and operated at any time.

Figure 3:
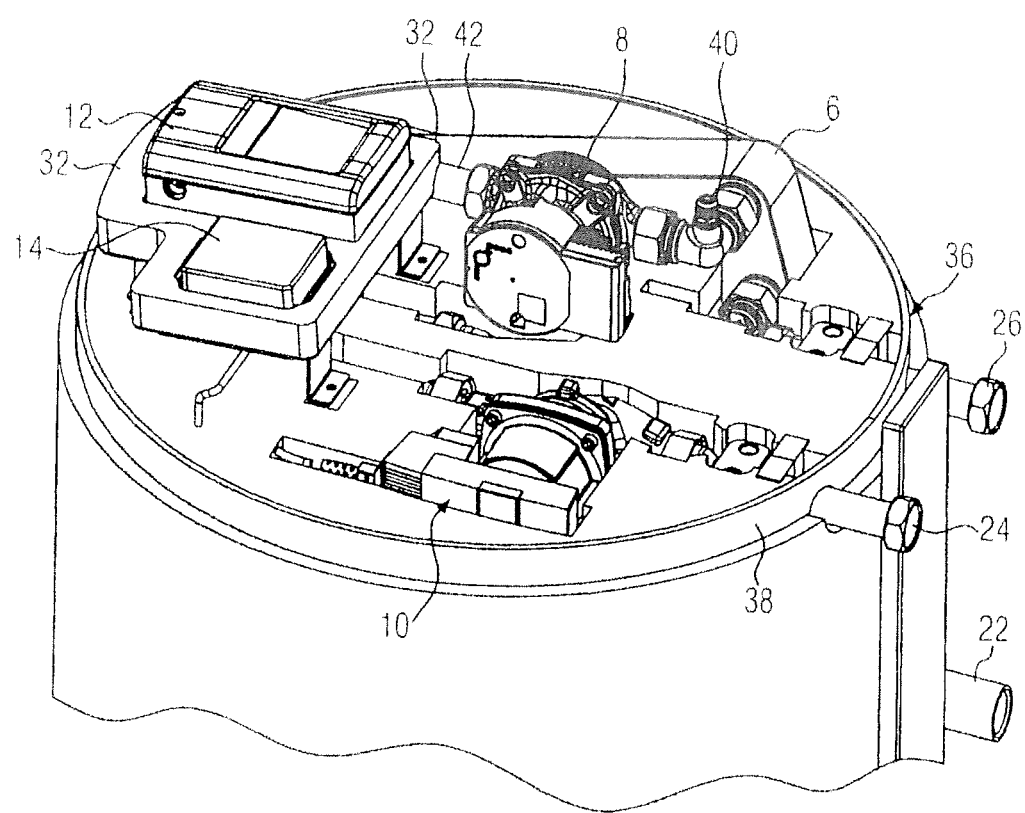

As illustrated by FIG. 3, the cover rests with its peripheral edge on a collar 36 formed by the circumferentially extending foamed component 28 and surrounded on the circumference thereof by a sealing strip 38, which, together with the rim of the cover 30 attached to the circumferentially extending foamed component 28, provides a tightly sealing contact.

FIG. 3 further illustrates that the technical components of the embodiment are surrounded by the sealing material of the circumferentially extending foamed component 28 in a contour-following manner, so that only small free spaces remain within the seal. The control element insulation 32 is separated and spaced apart from the technical components of the fluid circuit of the embodiment by metallic angle pieces, whereby the thermal insulation of the control device 12 and the data logger 14, respectively, is improved. Reference numeral 40 identifies an upper vent valve 40 to a piping of the cooling medium circuit identified by reference numeral 42.

FIG. 3 further illustrates that the supply and return connections 26, 24 for the drinking water protrude beyond the circumference of the insulation in the form of the circumferentially extending foamed component 28 and thus provide connection points for the drinking water to be cooled. The same applies to the cooling medium connections. Also FIG. 3 shows only one of these connections 22.

FIG. 2 illustrates also the electrical connection of the embodiment. For this purpose, the cover 30 has formed therein a cable duct 44 that ends in a connector reception means 46, in which a cable strand 48 routed thereinto and ending in a plug element 50 is connected to a mating connector 52 of a cable strand 54 leading to the control device 12/14. For lifting off the cover 30, the plug connection between the two plug elements 50, 52 must be disconnected. This will inevitably result in powering-off the embodiment for the purpose of mounting.

FIG. 1 shows the positions of a temperature sensor 56 for the drinking water supply and of a temperature sensor 58 for the drinking water return. In FIG. 1, reference numeral 60 identifies a medium temperature sensor which is associated with the buffer tank 4 and is data-connected to the control device 12 by a data connection (not shown). Within the buffer tank 4 and denoted by reference numeral 62, FIG. 1 elucidates a perforated plate, which perforated plate is installed in the buffer tank 4 in the area of a cooling medium inlet 64. The perforated plate 62 extends horizontally within the buffer tank 4.

LIST OF REFERENCE NUMERALS 2 drinking water circulation device
4 buffer tank
6 plate heat exchanger
8 cooling medium pump
10 drinking water circulation pump
12 control device
14 data logger 16 operating unit
20 bottom/support area
22 cooling medium connection
24 return connection drinking water cold
26 supply connection drinking water cold
28 circumferentially extending foamed component
30 cover
32 control element insulation
34 window
36 collar
38 sealing strip
40 vent valve
42 piping of the cooling medium circuit
44 cable duct
46 connector reception means
48 routed cable strand
50 plug element
52 mating connector
54 cable strand
56 temperature sensor drinking water supply
58 temperature sensor drinking water return
60 cooling medium temperature sensor
62 perforated plate
64 cooling medium inlet

The invention claimed is:

1. A drinking water circulation device comprising a heat exchanger for cooling the drinking water, a return connection for feeding drinking water returned from a circulation pipe into the drinking water circulation device, a supply connection for discharging the cooled drinking water from the drinking water circulation device, a drinking water circulation pump provided between the return connection and the supply connection, a buffer tank for a cooling medium, a cooling medium pump provided in a cooling medium flow path between the buffer tank and the heat exchanger, a control device for controlling the cooling medium pump and a supply temperature sensor, which is associated with the supply and is data-connected to the control device.

2. The drinking water circulation device according to claim 1, comprising a temperature sensor associated with the drinking water return, characterized in that the temperature sensor is data-connected to the control device and that the control device controls the circulation pump.

3. The drinking water circulation device according to claim 1, characterized by a cooling medium temperature sensor, which is associated with the buffer tank and is data-connected to the control device.

4. The drinking water circulation device according to claim 1, characterized in that the buffer tank defines a flat support area and that the heat exchanger, pipes of the drinking water path within the drinking water circulation device, the drinking water circulation pump, the cooling medium pump and the control device are arranged above the buffer tank when the flat support area is horizontally oriented.

5. The drinking water circulation device according to claim 1, characterized by at least one horizontally extending perforated plate installed in the buffer tank in the area of a cooling medium inlet.

6. The drinking water circulation device according to claim 1, characterized in that the heat exchanger is a plate heat exchanger mounted, in oblique orientation relative to the gravitational field of the earth, above the surface of the buffer tank.

7. The drinking water circulation device according to claim 1, characterized by a thermal insulation surrounding at least the buffer tank and formed by thermal insulation components, which are plug-connected to one another with an intermediate sealing element therebetween.

8. The drinking water circulation device according to claim 1, characterized in that thca thermal insulation surrounds media-carrying components of the drinking water circulation device in a contour-following manner.

9. The drinking water circulation device according to claim 1, characterized in that an operating unit of the control device is exposed in a cover of a thermal insulation surrounding at least the buffer tank.

10. The drinking water circulation device according to claim 1, characterized in that a thermal insulation comprises a circumferentially extending foamed component, which insulates the buffer tank on the outer circumference thereof and on the outer side of which the supply and return connections are exposed, cooling medium supply and return pipes, which lead to the buffer tank, extending through the foamed component.

11. The drinking water circulation device according to claim 1, characterized in that the buffer tank contains a water/glycol mixture.

12. The drinking water circulation device according to claim 1, characterized in that the buffer tank has a storage capacity of 100 l+/−30 l.

* * * * *